United States Patent
Ariga et al.

(10) Patent No.: US 11,227,718 B2
(45) Date of Patent: Jan. 18, 2022

(54) METHOD OF MANUFACTURING MULTILAYER CERAMIC CAPACITOR AND MULTILAYER CERAMIC CAPACITOR

(71) Applicant: TAIYO YUDEN CO., LTD., Tokyo (JP)

(72) Inventors: Jyouji Ariga, Takasaki (JP); Takeshi Nosaki, Takasaki (JP); Masumi Ishii, Takasaki (JP); Norihiro Arai, Takasaki (JP); Hiroyuki Moteki, Takasaki (JP); Manabu Ozawa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/287,851

(22) Filed: Feb. 27, 2019

(65) Prior Publication Data

US 2019/0272954 A1     Sep. 5, 2019

(30) Foreign Application Priority Data

Mar. 2, 2018 (JP) .............................. JP2018-037236
Dec. 4, 2018 (JP) .............................. JP2018-227053

(51) Int. Cl.
*H01G 4/12* (2006.01)
*H01G 4/012* (2006.01)
(Continued)

(52) U.S. Cl.
CPC ........... *H01G 4/1236* (2013.01); *H01G 4/008* (2013.01); *H01G 4/012* (2013.01); *H01G 4/248* (2013.01); *H01G 4/30* (2013.01)

(58) Field of Classification Search
CPC .......... H01G 4/12; H01G 4/1236; H01G 4/30; H01G 4/008; H01G 4/012; H01G 4/248
(Continued)

(56) References Cited

U.S. PATENT DOCUMENTS

2006/0198078 A1* 9/2006 Miyauchi ................. H01G 4/30
                                                              361/305
2009/0046410 A1    2/2009 Takeoka
(Continued)

FOREIGN PATENT DOCUMENTS

CN        102867564 A       1/2013
CN        102969154 A       3/2013
(Continued)

OTHER PUBLICATIONS

First Office Action issued by the State Intellectual Property Office of China dated Aug. 18, 2021 for Chinese counterpart application No. 201910154616.7 (9 pages).

*Primary Examiner* — Arun Ramaswamy
(74) *Attorney, Agent, or Firm* — Law Office of Katsuhiro Arai (57) ABSTRACT

A method of manufacturing a multilayer ceramic capacitor includes: forming a multilayer body by alternately stacking a green sheet and a conductive paste for forming an internal electrode layer, the green sheet being mainly composed of a ceramic material having a perovskite structure that includes Ca and Zr and is expressed by a general expression $ABO_3$ and containing an alkali metal, the conductive paste being mainly composed of Cu, containing a ceramic co-material and no alkali metal; and baking the multilayer body to obtain a ceramic multilayer body.

11 Claims, 12 Drawing Sheets

(51) Int. Cl.
*H01G 4/30* (2006.01)
*H01G 4/248* (2006.01)
*H01G 4/008* (2006.01)

(58) Field of Classification Search
USPC ............... 361/321.1, 321.2, 305, 321.5, 311
See application file for complete search history.

(56) References Cited

U.S. PATENT DOCUMENTS

| | | |
|---|---|---|
| 2013/0009515 A1 | 1/2013 | Kim et al. |
| 2013/0049532 A1* | 2/2013 | Kim .................. H01C 7/18 |
| | | 310/311 |
| 2013/0286539 A1* | 10/2013 | Kim .................. H01G 4/012 |
| | | 361/303 |
| 2014/0009864 A1 | 1/2014 | Takashima et al. |
| 2014/0043722 A1 | 2/2014 | Hirata et al. |
| 2017/0345570 A1* | 11/2017 | Sakatsume ........... H01G 4/1236 |
| 2017/0365407 A1 | 12/2017 | Morita et al. |

FOREIGN PATENT DOCUMENTS

| | | |
|---|---|---|
| CN | 103377824 A | 10/2013 |
| CN | 103578757 A | 2/2014 |
| CN | 103180264 B | 2/2015 |
| CN | 107527738 B | 1/2021 |
| JP | H0737749 A | 2/1995 |
| JP | 2009007209 A | 1/2009 |

* cited by examiner

| | MAIN COMPONENT OF DIELECTRIC LAYER | ADDITIVE OF DIELECTRIC LAYER | MAIN COMPONENT OF INTERNAL ELECTRODE LAYER | CO-MATERIAL OF INTERNAL ELECTRODE LAYER | MAIN COMPONENT OF EXTERNAL ELECTRODE | CO-MATERIAL OF EXTERNAL ELECTRODE | CHIP SIZE [mm] | THICKNESS OF DIELECTRIC LAYER [μm] |
|---|---|---|---|---|---|---|---|---|
| EXAMPLE 1 | CaZrO$_3$ | BN + SiO$_2$ + Li$_2$CO$_3$ + MnCO$_3$ | Cu | CaZrO$_3$ | Cu | CaZrO$_3$ | 1.0×0.5×0.5 | 46.0 |
| EXAMPLE 2 | | | | | | | | 27.6 |
| EXAMPLE 3 | | | | | | | | 23.1 |
| EXAMPLE 4 | | | | | | | | 18.4 |
| EXAMPLE 5 | | | | | | | | 15.2 |
| EXAMPLE 6 | | | | | | | 1.6×0.8×0.8 | 46.0 |
| EXAMPLE 7 | | | | | | | | 27.6 |
| EXAMPLE 8 | | | | | | | | 23.1 |
| EXAMPLE 9 | | | | | | | | 18.4 |
| EXAMPLE 10 | | | | | | | | 15.2 |

FIG. 8B

| | MAIN COMPONENT OF DIELECTRIC LAYER | ADDITIVE OF DIELECTRIC LAYER | MAIN COMPONENT OF INTERNAL ELECTRODE LAYER | CO-MATERIAL OF INTERNAL ELECTRODE LAYER | MAIN COMPONENT OF EXTERNAL ELECTRODE | CO-MATERIAL OF EXTERNAL ELECTRODE | CHIP SIZE [mm] | THICKNESS OF DIELECTRIC LAYER [μm] |
|---|---|---|---|---|---|---|---|---|
| COMPARATIVE EXAMPLE 1 | CaZrO$_3$ | BN + SiO$_2$ + Li$_2$CO$_3$ + MnCO$_3$ | Cu | NOT CONTAINED | Cu | NOT CONTAINED | 1.0×0.5×0.5 | 46.0 |
| COMPARATIVE EXAMPLE 2 | | | | | | | | 27.6 |
| COMPARATIVE EXAMPLE 3 | | | | | | | | 23.1 |
| COMPARATIVE EXAMPLE 4 | | | | | | | | 18.4 |
| COMPARATIVE EXAMPLE 5 | | | | | | | | 15.2 |
| COMPARATIVE EXAMPLE 6 | | | | | | | 1.6×0.8×0.8 | 46.0 |
| COMPARATIVE EXAMPLE 7 | | | | | | | | 27.6 |
| COMPARATIVE EXAMPLE 8 | | | | | | | | 23.1 |
| COMPARATIVE EXAMPLE 9 | | | | | | | | 18.4 |
| COMPARATIVE EXAMPLE 10 | | | | | | | | 15.2 |

FIG. 9A

|  | ELECTRIC FIELD INTENSITY [V/μm] | ELECTROSTATIC CAPACITANCE CHANGE RATIO |  | ELECTRIC FIELD INTENSITY [V/μm] | ELECTROSTATIC CAPACITANCE CHANGE RATIO |
|---|---|---|---|---|---|
| EXAMPLE 1 | 6.5 | 0.0% | COMPARATIVE EXAMPLE 1 | 6.5 | 0.0% |
| EXAMPLE 2 | 10.9 | 0.0% | COMPARATIVE EXAMPLE 2 | 10.9 | 0.0% |
| EXAMPLE 3 | 13.0 | 0.0% | COMPARATIVE EXAMPLE 3 | 13.0 | 4.7% |
| EXAMPLE 4 | 16.3 | 0.0% | COMPARATIVE EXAMPLE 4 | 16.3 | 5.8% |
| EXAMPLE 5 | 19.7 | 0.0% | COMPARATIVE EXAMPLE 5 | 19.7 | 5.9% |

| | TEST DURATION [hour] | | | | | |
|---|---|---|---|---|---|---|
| | 0 | 100 | 200 | 300 | 400 | 500 |
| EXAMPLE 1 | 0.0% | 0.0% | 0.0% | 0.0% | 0.0% | 0.0% |
| EXAMPLE 2 | 0.0% | 0.0% | 0.0% | 0.1% | 0.0% | 0.1% |
| EXAMPLE 3 | 0.0% | 0.0% | 0.0% | 0.0% | 0.0% | 0.0% |
| EXAMPLE 4 | 0.0% | 0.0% | 0.0% | 0.0% | 0.0% | 0.0% |
| EXAMPLE 5 | 0.0% | 0.0% | 0.0% | 0.0% | 0.1% | 0.1% |
| EXAMPLE 6 | 0.0% | 0.0% | 0.0% | 0.1% | 0.1% | 0.1% |
| EXAMPLE 7 | 0.0% | 0.1% | 0.0% | 0.1% | 0.1% | 0.1% |
| EXAMPLE 8 | 0.0% | 0.0% | 0.0% | 0.1% | 0.1% | 0.1% |
| EXAMPLE 9 | 0.0% | 0.1% | 0.0% | 0.1% | 0.1% | 0.1% |
| EXAMPLE 10 | 0.0% | 0.0% | 0.0% | 0.0% | 0.1% | 0.1% |

|  | TEST DURATION [hour] | | | | | |
|---|---|---|---|---|---|---|
|  | 0 | 100 | 200 | 300 | 400 | 500 |
| COMPARATIVE EXAMPLE 1 | 0.0% | 0.3% | 0.8% | 1.7% | 2.8% | 3.3% |
| COMPARATIVE EXAMPLE 2 | 0.0% | 0.7% | 1.2% | 2.1% | 3.0% | 3.4% |
| COMPARATIVE EXAMPLE 3 | 0.0% | 0.7% | 1.3% | 2.2% | 3.1% | 3.5% |
| COMPARATIVE EXAMPLE 4 | 0.0% | 1.4% | 2.0% | 2.7% | 3.8% | 4.2% |
| COMPARATIVE EXAMPLE 5 | 0.0% | 0.3% | 0.8% | 1.8% | 2.9% | 3.5% |
| COMPARATIVE EXAMPLE 6 | 0.0% | 0.9% | 1.6% | 2.5% | 3.9% | 4.3% |
| COMPARATIVE EXAMPLE 7 | 0.0% | 0.7% | 1.6% | 2.8% | 4.4% | 4.9% |
| COMPARATIVE EXAMPLE 8 | 0.0% | 1.4% | 2.2% | 3.2% | 4.7% | 5.1% |
| COMPARATIVE EXAMPLE 9 | 0.0% | 0.6% | 1.4% | 2.6% | 4.0% | 4.5% |
| COMPARATIVE EXAMPLE 10 | 0.0% | 1.2% | 2.0% | 3.0% | 4.2% | 4.6% |

FIG. 11B

METHOD OF MANUFACTURING MULTILAYER CERAMIC CAPACITOR AND MULTILAYER CERAMIC CAPACITOR

CROSS-REFERENCE TO RELATED APPLICATION

This application is based upon and claims the benefits of priority of the prior Japanese Patent Application No. 2018-037236, filed on Mar. 2, 2018, and the prior Japanese Patent Application No. 2018-227053, filed on Dec. 4, 2018, the entire contents of which are incorporated herein by reference.

FIELD

A certain aspect of the present invention relates to a method of manufacturing a multilayer ceramic capacitor and a multilayer ceramic capacitor.

BACKGROUND

For example, Japanese Patent Application Publication No. 2009-007209 discloses a multilayer ceramic capacitor in which a dielectric ceramic mainly composed of calcium zirconate ($CaZrO_3$) is used for a dielectric layer and copper (Cu) is used for an internal electrode.

SUMMARY OF THE INVENTION

According to a first aspect of the present invention, there is provided a method of manufacturing a multilayer ceramic capacitor including: forming a multilayer body by alternately stacking a green sheet and a conductive paste for forming an internal electrode layer, the green sheet being mainly composed of a ceramic material having a perovskite structure that includes Ca and Zr and is expressed by a general expression $ABO_3$ and containing an alkali metal, the conductive paste being mainly composed of Cu, containing a ceramic co-material and no alkali metal; and baking the multilayer body to obtain a ceramic multilayer body.

According to a second aspect of the present invention, there is provided a multilayer ceramic capacitor including: a ceramic multilayer body including a ceramic dielectric layer and an internal electrode layer that are alternately stacked and having a substantially rectangular parallelepiped shape, the ceramic dielectric layer being mainly composed of Ca, Zr, and O and containing an alkali metal, the internal electrode layer being mainly composed of Cu and containing a co-material containing Ca, Zr, and O and no alkali metal; and at least two external electrodes that are coupled to a plurality of the internal electrode layers led out to an end face of the ceramic multilayer body.

According to a third aspect of the present invention, there is provided a multilayer ceramic capacitor including: a ceramic multilayer body including a ceramic dielectric layer and an internal electrode layer that are alternately stacked and having a substantially rectangular parallelepiped shape, the ceramic dielectric layer being mainly composed of Ca, Zr, and O and containing an alkali metal, the internal electrode layer being mainly composed of Cu and containing a co-material containing Ca, Zr, and O; and at least two external electrodes that are coupled to a plurality of the internal electrode layers led out to an end face of the ceramic multilayer body.

BRIEF DESCRIPTION OF THE DRAWINGS

FIG. 6C is a diagram obtained by superimposing FIG. 6A on FIG. 6B, FIG. 6D and FIG. 6E are schematic diagrams illustrating images showing measurement results of Cu and Li in the cross-section of a multilayer ceramic capacitor 100 in which the internal electrode layer contained 10 parts by weight co-material, respectively.

DETAILED DESCRIPTION

In recent years, as transistors used for power amplifiers or the like for mobile phone base stations are changed from lateral diffusion MOS (LDMOS) transistors to gallium nitride (GaN) transistors, there are moves to increase the power source voltage from 28 V to 48 V With this change, the voltage applied to the multilayer ceramic capacitor may become 230 V, and multilayer ceramic capacitors that operate at a rated voltage equal to or greater than 500 V have been required. Furthermore, since the increase in applied voltage may increase the amount of heat generation, the operation at high temperature such as 150° C. is required to be guaranteed.

Hereinafter, with reference to the accompanying drawings, an embodiment will be described.

Embodiment

Figure 1:
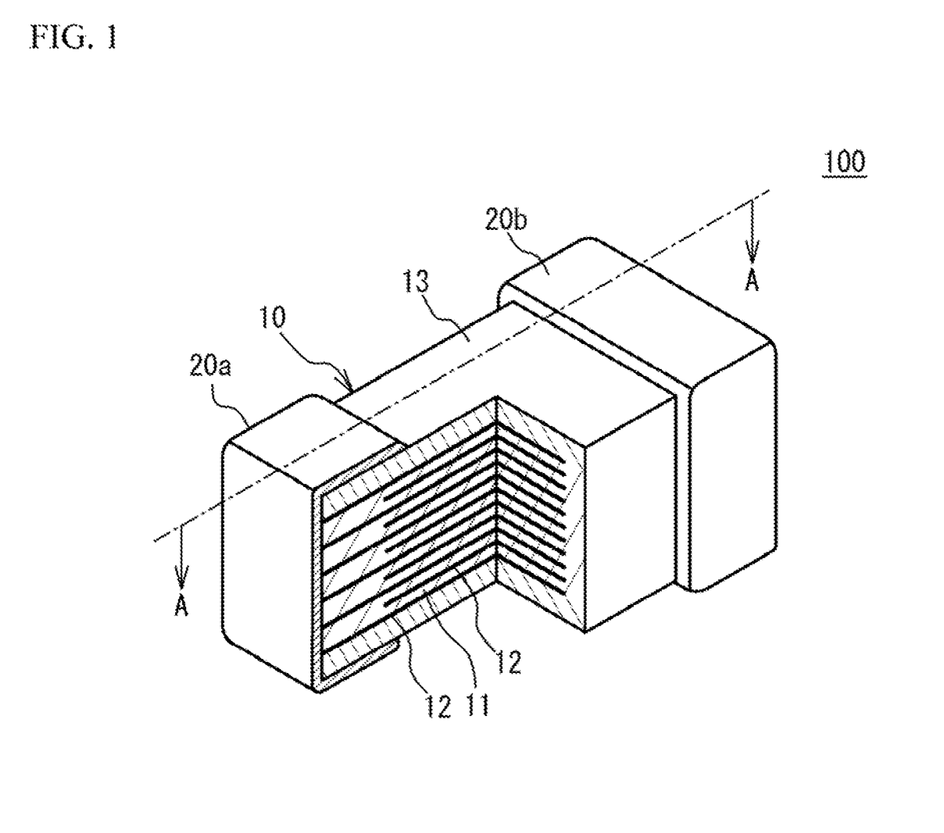
FIG. 1 is a partial cross-sectional perspective view of a multilayer ceramic capacitor.

A multilayer ceramic capacitor will be described. FIG. 1 is a partial cross-sectional perspective view of a multilayer ceramic capacitor 100. As illustrated in FIG. 1, the multilayer ceramic capacitor 100 includes a ceramic multilayer body 10 having a substantially rectangular parallelepiped shape, and external electrodes 20a and 20b located on two end faces facing each other of the ceramic multilayer body 10. Here, the substantially rectangular parallelepiped shape includes a rectangular parallelepiped shape of which the ridge parts are rounded. Four faces other than the two end faces of the ceramic multilayer body 10 are referred to as side faces. The external electrodes 20a and 20b extend to the four side faces. However, the external electrodes 20a and 20b are separated from each other on the four side faces.

The ceramic multilayer body 10 has a structure designed to have ceramic dielectric layers 11 and internal electrode layers 12 alternately stacked. The ceramic dielectric layers 11 contain a ceramic material functioning as a dielectric material. End edges of the internal electrode layers 12 are alternately exposed to the end face of the ceramic multilayer body 10 on which the external electrode 20a is located and the end face of the ceramic multilayer body 10 on which the external electrode 20b is located. Thus, the internal electrode layers 12 are alternately electrically connected to the external electrode 20a and the external electrode 20b. In addition, in the ceramic multilayer body 10, cover layers 13 cover two side faces corresponding to the upper face and the lower face in the direction in which the ceramic dielectric layers 11 and the internal electrode layers 12 are stacked (hereinafter, referred to as a stacking direction) among four side faces. The cover layer 13 is mainly composed of a ceramic material. For example, the main component material of the cover layer 13 is the same as that of the ceramic dielectric layer 11. In the ceramic multilayer body 10, the internal electrode layers 12 may be exposed to (led out to) faces other than the two opposed end faces on which the external electrodes 20a and 20b are located in FIG. 1 to be connected to the external electrodes.

The multilayer ceramic capacitor 100 has, for example, a length of 0.2 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 1.6 mm, a width of 0.8 mm, and a height of 0.8 mm. The multilayer ceramic capacitor 100 may have a length of 2.0 mm, a width of 1.25 mm, and a height of 1.25 mm. The multilayer ceramic capacitor 100 may have a length of 3.2 mm, a width of 1.6 mm, and a height of 1.6 mm. The multilayer ceramic capacitor 100 may have a length of 4.5 mm, a width 3.2 mm, and a height of 2.5 mm. However, the dimensions of the multilayer ceramic capacitor 100 are not limited to the above dimensions.

The ceramic dielectric layer 11 is mainly composed of a ceramic material having a perovskite structure that includes calcium (Ca) and zirconium (Zr) and is expressed by a general expression $ABO_3$. The perovskite structure includes $ABO_{3-\alpha}$ having an off-stoichiometric composition. For example, calcium zirconate ($CaZrO_3$) can be used as the ceramic material. The electrostatic capacitance of the perovskite including Ca and Zr little varies with temperature. Thus, the perovskite including Ca and Zr has a characteristic that its temperature coefficient Tc [ppm/° C.] is small. The ceramic dielectric layer 11 has a thickness of, for example, 5 μm to 50 μm. The ceramic dielectric layer 11 preferably has a thickness of 20 μm or less when the multilayer ceramic capacitor 100 has a length of 1.6 mm or less, a width of 0.8 mm or less, and a height of 0.8 mm or less.

The internal electrode layer 12 is a conductive thin film that is mainly composed of copper (Cu), and contains a co-material containing Ca, Zr, and O and no alkali metal. For example, the internal electrode layer 12 is a conductive thin film that is mainly composed of Cu and contains a co-material containing $CaZrO_3$ and no alkali metal. Alternatively, for example, the internal electrode layer 12 is a conductive thin film that is mainly composed of Cu and contains a co-material made of $CaZrO_3$. Alternatively, for example, the internal electrode layer 12 is a conductive thin film that is mainly composed of Cu and contains a co-material made of only $CaZrO_3$. When the above described composition is precisely analyzed, a slight amount of impurities may be detected. However, the slight amount of impurities does not affect the advantage.

Figure 2:
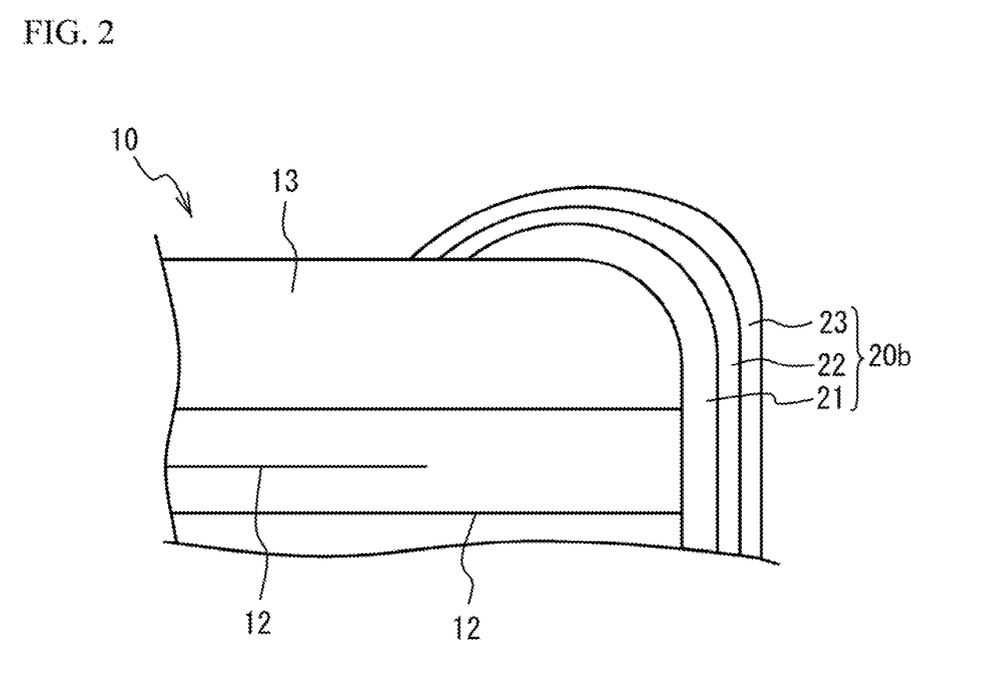
FIG. 2 is a partial cross-sectional view taken along line A-A in FIG. 1.

FIG. 2 is a cross-sectional view of the external electrode 20b and is a partial cross-sectional view taken along line A-A in FIG. 1. In FIG. 2, hatching for indicating the cross-section is omitted. On the surface of the ceramic multilayer body 10, a ceramic material is mainly exposed. Thus, it is difficult to form a plated layer on the surface of the ceramic multilayer body 10 without forming a ground layer. Thus, as illustrated in FIG. 2, the external electrode 20b has a structure in which a plated layer is formed on a ground conductive layer 21 formed on the surface of the ceramic multilayer body 10. The plated layer includes a first plated layer 22 that is in contact with the ground conductive layer 21 and covers the ground conductive layer 21, and a second plated layer 23 that is in contact with the first plated layer 22 and covers the first plated layer 22. A ground plated layer may be located between the ground conductive layer 21 and the first plated layer 22. The ground conductive layer 21 is mainly composed of a metal such as Cu, nickel (Ni), aluminum (Al), zinc (Zn), silver (Ag), gold (Au), palladium (Pd), or platinum (Pt) or an alloy of at least two of them (for example, an alloy of Cu and Ni), and contains a ceramic such as a glass component for densifying the ground conductive layer 21 or a co-material for controlling sinterability of the ground conductive layer 21. Examples of the glass component includes, but are not limited to, oxides of barium (Ba), strontium (Sr), Ca, Zn, Al, silicon (Si), and boron (B). The co-material is, for example, a ceramic component of which the main component is the same as that of the ceramic dielectric layer 11. The plated layer is mainly composed of a metal such as Cu, Ni, Al, Zn, or tin (Sn), or an alloy of at least two of them.

Figure 3:
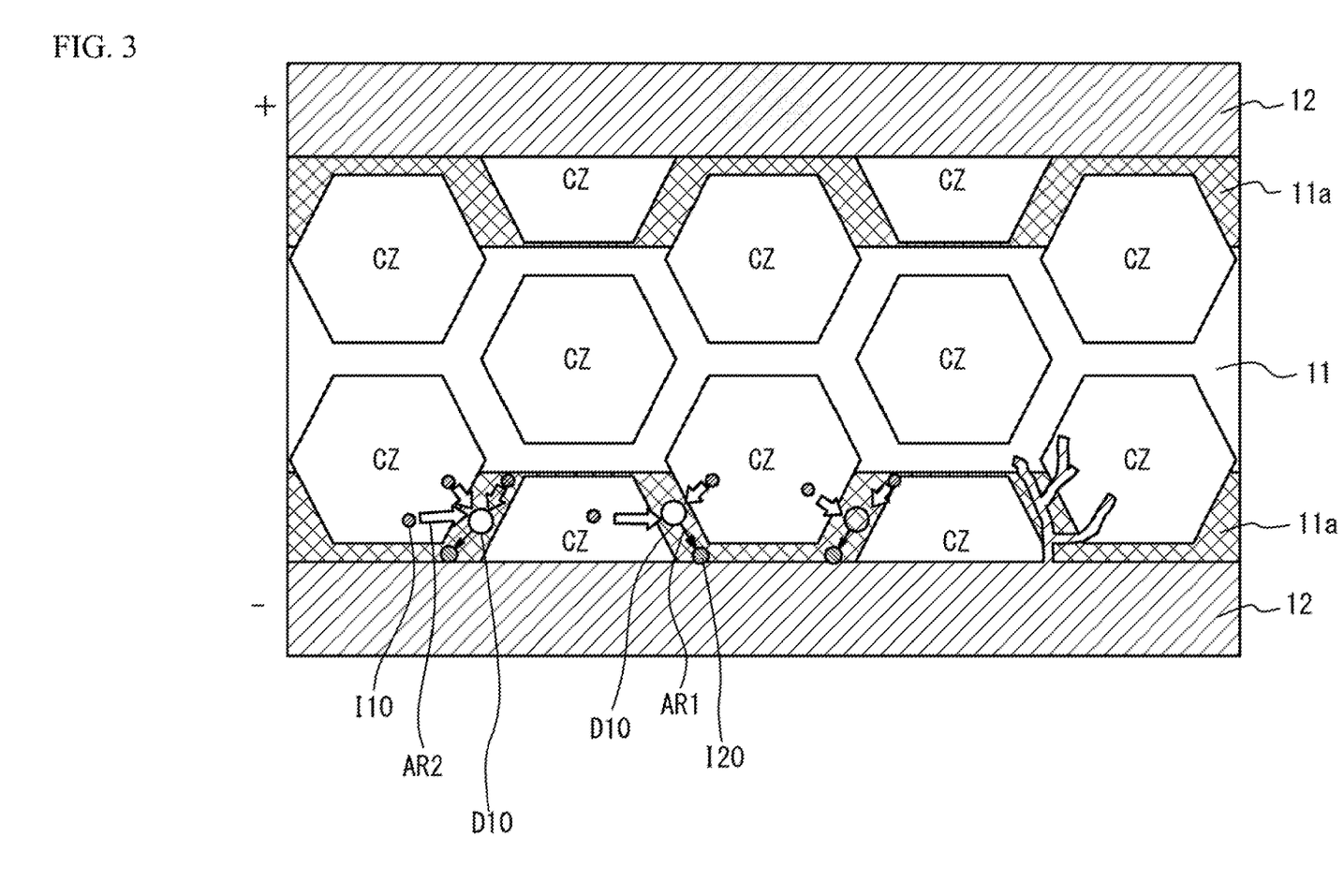
FIG. 3 is a diagram for describing a mechanism responsible for the increase in electrostatic capacitance.

The multilayer ceramic capacitor 100 operating at a higher rated voltage has been desired. However, when a high voltage is applied to the multilayer ceramic capacitor 100 from the outside under high temperature, as indicated by an arrow AR1 in FIG. 3, alkali metal ions 120 (for example, $Li^+$) in the amorphous phase that is present in the grain boundary within the ceramic dielectric layer 11 migrate. At this time, as indicated by an arrow AR2, in regions 11a in which Cu has been diffused by baking, $Cu^{2+}$ (indicated by 110) generated by ionization of Cu present in the region 11a at the negative electrode side enters into defects D 10 formed by the migration of the alkali metal ions 120, and gradually migrates to the internal electrode layer 12 at the negative electrode side. $Cu^{2+}$ that has reached the internal electrode layer 12 at the negative electrode side receives electrons and is then deposited. Accordingly, as illustrated in FIG. 3, the internal electrode layer 12 extends in the electric field direction, the surface area of the internal electrode layer 12 increases, and the distance between the internal electrode layers 12 decreases. This results in the increase in capacitance of the multilayer ceramic capacitor 100. The electrostatic capacitance change ratio due to this capacitance increase is a serious flaw that exceeds the range specified for a temperature compensation multilayer ceramic capacitor classified into EIA standard, Class 1, thereby decreasing the reliability.

Figure 4:
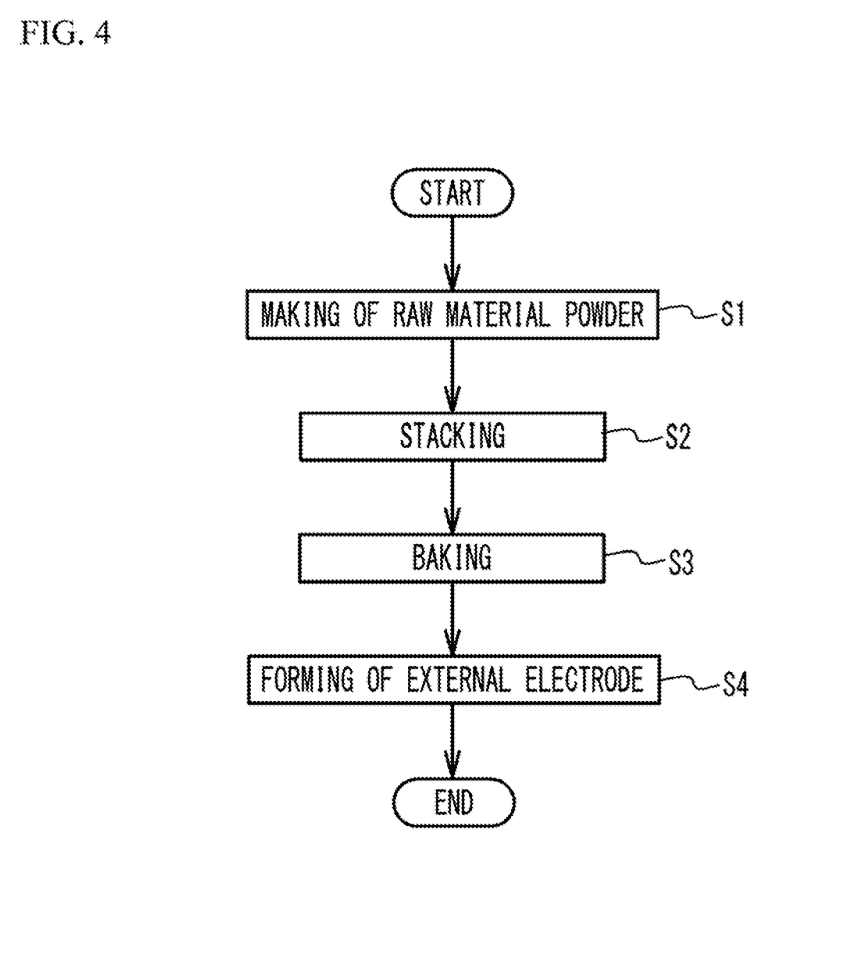
FIG. 4 is a flowchart illustrating a method of manufacturing the multilayer ceramic capacitor.

Thus, a method of manufacturing the multilayer ceramic capacitor 100 with high reliability will be described. FIG. 4 is a flowchart of the method of manufacturing the multilayer ceramic capacitor 100.

Making Process of Raw Material Powder

An additive compound predetermined in accordance with purposes may be added to powder of the ceramic material that is the main component of the ceramic dielectric layer 11. $CaZrO_3$ can be used as the ceramic material. The additive compound may be an oxide of magnesium (Mg), manganese (Mn), vanadium (V), chrome (Cr), or a rare-earth elements (yttrium (Y), samarium (Sm), europium (Eu), gadolinium (Gd), terbium (Tb), dysprosium (Dy), holmium (Ho), erbium (Er), thulium (Tm), or ytterbium (Yb)), an oxide of Co, Ni, lithium (Li), B, sodium (Na), potassium (K), or Si, or glass. For example, a compound containing the additive compound is mixed with the ceramic material powder, and the resultant ceramic material powder is calcined. Then, the resultant ceramic material powder is wet-blended with the additive compound. After that, the ceramic material powder with the additive compound is dried and crushed to prepare the desired ceramic material powder.

Then, a binder such as a polyvinyl butyral (PVB) resin, an organic solvent such as ethanol or toluene, and a plasticizer are added to the prepared ceramic material powder and wet-blended. With use of the resultant slurry, a strip-shaped dielectric green sheet with a thickness of, for example, 5 to 20 μm is applied on a base material by, for example, a die coating method or a doctor blade method, and then dried.

Stacking Process

Then, a pattern of the internal electrode layer 12 is arranged on the surface of the dielectric green sheet by printing a conductive paste for forming an internal electrode layer by screen printing or gravure printing. The conductive paste for forming an internal electrode layer contains powder of the main component metal of the internal electrode layers 12, a co-material, a binder, a solvent, and additives as necessary. The co-material, the binder, the solvent, and additives contain no alkali metal. A ceramic material ($CaZrO_3$) that is the main component of the ceramic dielectric layer 11 can be used as the co-material. Cu can be used as the main component metal.

Then, the dielectric green sheet on which the internal electrode layer pattern is printed is stamped into a predetermined size, and the predetermined number (for example, 4 to 50) of stamped dielectric green sheets are stacked while the base material is peeled so that the internal electrode layers 12 and the ceramic dielectric layers 11 are alternated with each other and the end edges of the internal electrode layers 12 are alternately exposed to both end faces in the length direction of the ceramic dielectric layer 11 so as to be alternately led out to a pair of external electrodes of different polarizations. Cover sheets, which are to be the cover layers 13, are stacked on the stacked green sheets and under the stacked green sheets and are thermally compressed. The resultant multilayer body is cut into a predetermined size (for example, 1.6 mm×0.8 mm). Thereafter, a metal conductive paste, which is to be a ground layer of the external electrodes 20a and 20b, is applied to both end faces of the cut multilayer body, and then dried. Through the above-described process, the compact of the multilayer ceramic capacitor 100 is obtained.

Baking Process

The ceramic multilayer body coated with a metal paste for forming an external electrode is baked in a reducing atmosphere containing approximately 1.5 volume percent of $H_2$ at approximately 900° C. to 1050° C. for approximately two hours. Through this process, the baking of the ceramic dielectric layers 11 and the internal electrode layers 12 and the baking of the ground conductive layer 21 are conducted at the same time, and the half-finished product of the multilayer ceramic capacitor 100 can be obtained.

External Electrode Forming Process

Then, the first plated layer 22 is formed on the ground conductive layer 21 by plating. Then, the second plated layer 23 is formed on the first plated layer 22 by plating.

Figure 5:
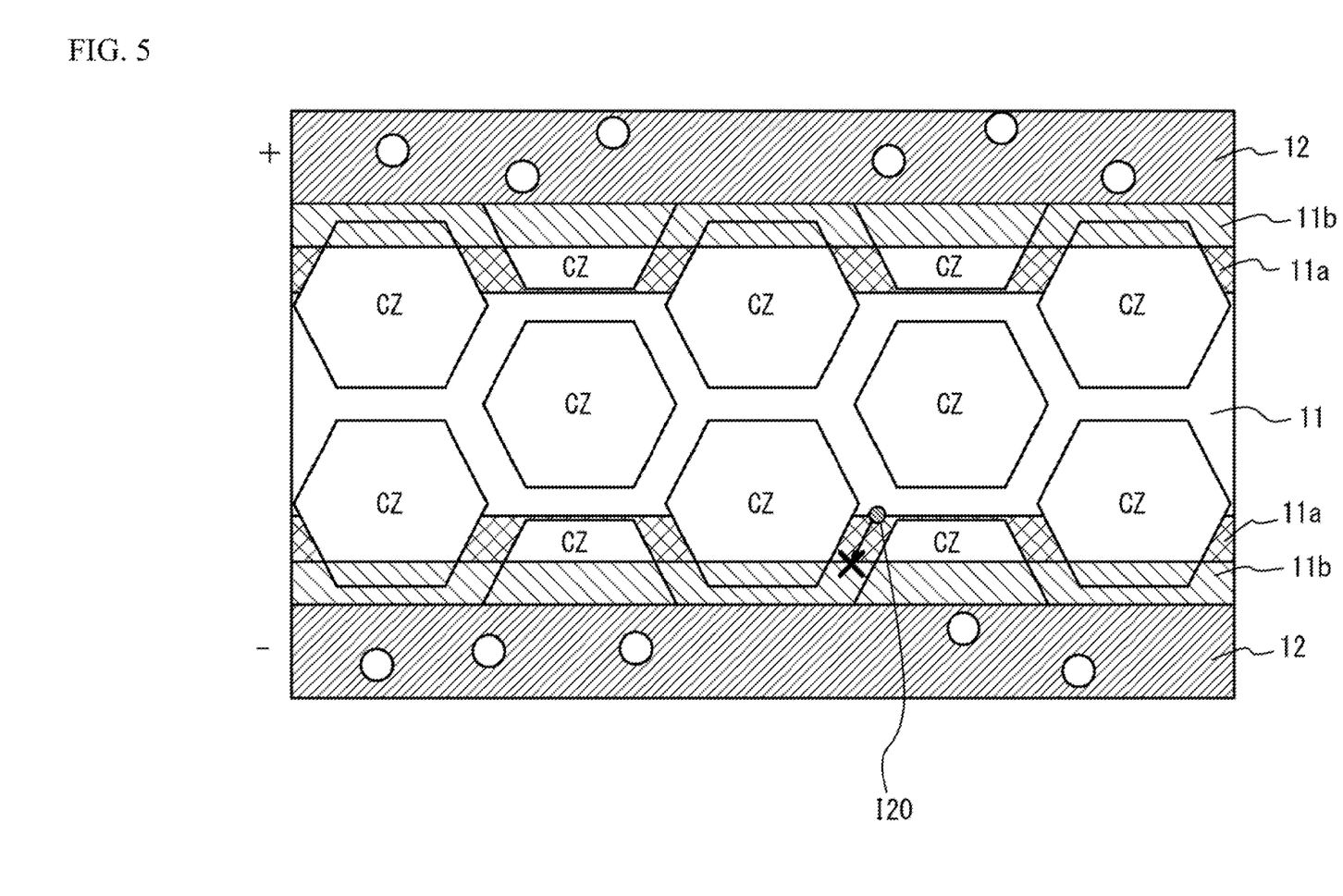
FIG. 5 is a diagram for describing a reason why the method of manufacturing the multilayer ceramic capacitor in accordance with the embodiment inhibits the increase in electrostatic capacitance.

According to the manufacturing method in accordance with the present embodiment, the conductive paste for forming the internal electrode layer contains, as a co-material, a ceramic material ($CaZrO_3$), which is the main component of the ceramic dielectric layer 11, but contains no alkali metal. It is estimated that this configuration causes the ceramic material ($CaZrO_3$) contained in the conductive paste for forming the internal electrode layer to be emitted toward the ceramic dielectric layer 11 in the baking process, and as illustrated in FIG. 5, a $CaZrO_3$ layer 11b in which the concentration of an alkali metal is low is formed near the boundary face between the ceramic dielectric layer 11, which is mainly composed of $CaZrO_3$ and contains Li, B, Mn, and Si, and the internal electrode layer 12. Accordingly, it is considered that the layer 11b functions like a barrier, and inhibits the migration of the alkali metal ions 120 even when a high voltage is applied. The inhibition of the migration of the alkali metal ions 120 inhibits $Cu^{2+}$, which is generated by ionization of Cu present in the region 11a in which Cu has been diffused by baking, from migrating toward the internal electrode layer 12 at the negative electrode side. Accordingly, $Cu^{2+}$ that has reached the internal electrode layer 12 at the negative electrode side is inhibited from receiving electrons and being deposited, and thereby, the internal electrode layer 12 is inhibited from extending in the electric field direction. Therefore, the increase in capacitance is inhibited.

The multilayer ceramic capacitor 100 manufactured by the manufacturing method of the present embodiment includes the ceramic multilayer body 10, and a pair of the external electrodes 20a and 20b formed from two end faces facing each other to at least one side face of the ceramic multilayer body 10. The ceramic multilayer body 10 includes the ceramic dielectric layer 11 and the internal electrode layer 12 that are alternately stacked, and has a substantially rectangular parallelepiped shape. The ceramic dielectric layer 11 is mainly composed of $CaZrO_3$ and contains an alkali metal, and the internal electrode layer 12 is mainly composed of Cu and contains a co-material containing $CaZrO_3$ and no alkali metal. In the multilayer ceramic capacitor 100, as illustrated in FIG. 5, the $CaZrO_3$ layer 11b in which the concentration of an alkali metal is low is formed near the boundary face between the ceramic dielectric layer 11 and the internal electrode layer 12. Thus, even when a high voltage is applied, the layer 11b functions like a burrier, thereby inhibiting the migration of the alkali metal ions 120. The inhibition of the migration of the alkali metal ions 120 inhibits $Cu^{2+}$, which is generated by ionization of Cu in the region 11a in which Cu has been diffused by baking, from migrating to the internal electrode layer 12 at the negative electrode side. Therefore, $Cu^{2+}$ that has reached the internal electrode layer 12 at the negative electrode side is inhibited from receiving electrons and being deposited. Thereby, the internal electrode layer 12 is inhibited from extending in the electric field direction, and the capacitance increase is inhibited.

The width of the layer 11b in the stacking direction is preferably within a range from 0.2 to 1.2 µm. By setting the upper limit for the width of the layer 11b, the main composition of the ceramic dielectric layer 11 can be configured to have high withstand voltage and be capable of operating at high temperature. By configuring the width of the layer 11b to be 0.2 µm or greater, a sufficient barrier function is achieved.

EXAMPLES

The multilayer ceramic capacitor 100 in which the internal electrode layer 12 was mainly composed of Cu and contained, as a co-material, 10 parts by weight (pts. wt.) $CaZrO_3$ only and a multilayer ceramic capacitor 200 in which the internal electrode layer 12 contained no co-material were cut at the position at which the ceramic dielectric layers and the internal electrode layer were alternately stacked. Then, the cross-section parallel to the stacking direction was analyzed by Time-of-Flight Secondary Ion Mass Spectrometry (TOF-SIMS). $CaZrO_3$ was used as the ceramic material for the main component of the ceramic dielectric layer 11, and the mol ratio of Ca to Zr (Ca/Zr) was configured to be 1.05. In addition, BN (3.5 mol %), $SiO_2$ (3.5 mol %), $Li_2CO_3$ (1.75 mol %), and $MnCO_3$ (3.5 mol %) were added to the ceramic dielectric layer 11 as additives.

Figure 6A:
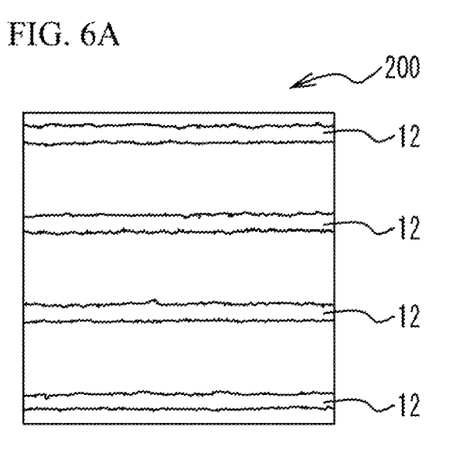
FIG. 6A and FIG. 6B are schematic diagrams illustrating images showing measurement results of Cu and Li in the cross-section of a multilayer ceramic capacitor 200 in which no co-material is contained in an internal electrode layer, respectively.
Figure 6B:
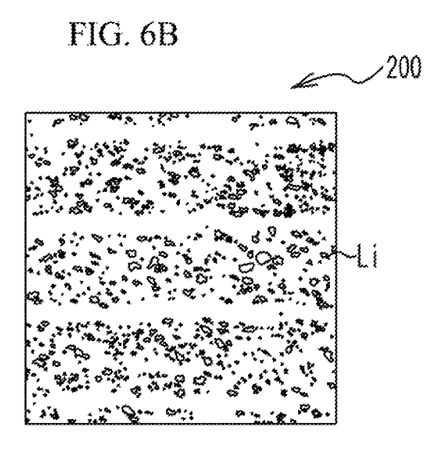
Figure 6C:
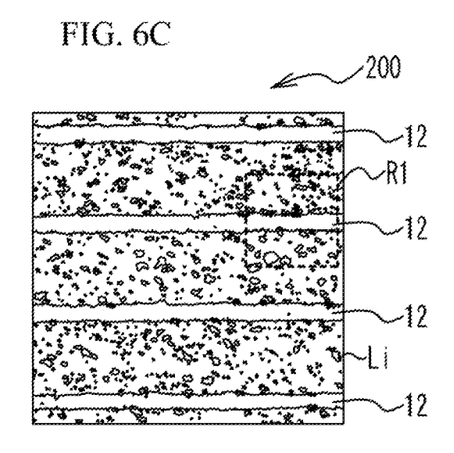
Figures 6D, 6E:
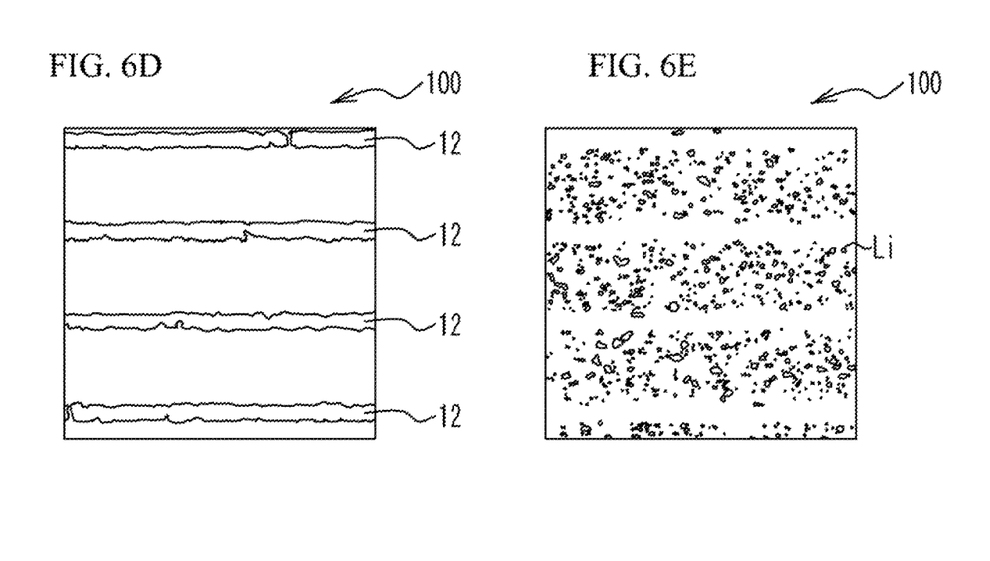
Figure 6F:
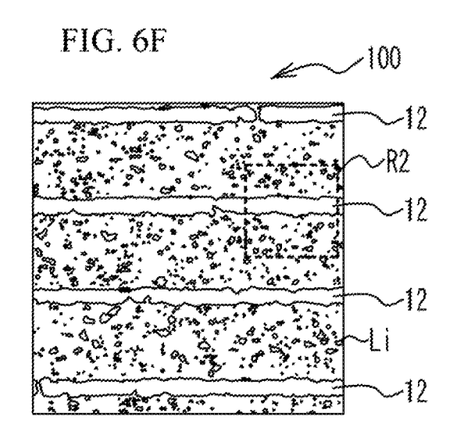
FIG. 6F is a diagram obtained by superimposing FIG. 6D on FIG. 6E.
Figure 7A:
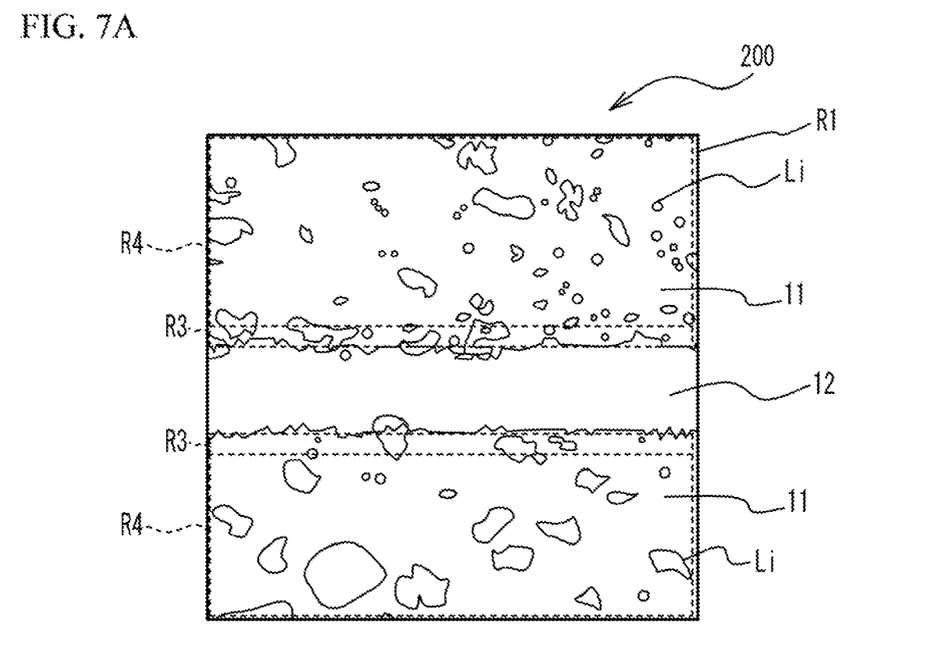
FIG. 7A is an enlarged view of a region R1 enclosed by a dotted line in FIG. 6C.
Figure 7B:
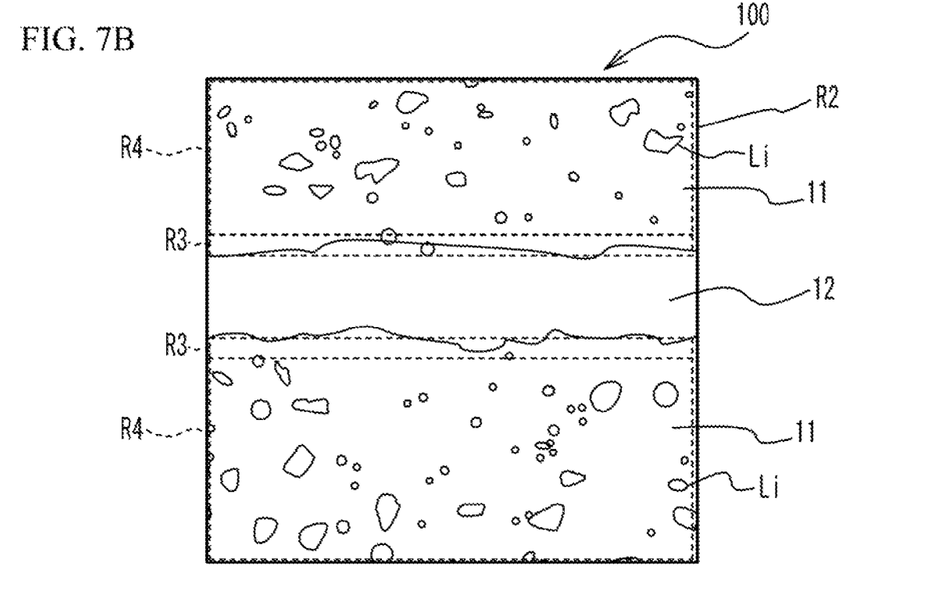
FIG. 7B is an enlarged view of a region R2 enclosed by a dotted line in FIG. 6F.

FIG. 6A and FIG. 6B are schematic diagrams illustrating images (60 µm×60 µm) showing measurement results of Cu and Li in the cross-section of the multilayer ceramic capacitor 200 in which the internal electrode layer 12 contained no co-material, respectively, and FIG. 6C is a diagram obtained by superimposing FIG. 6A on FIG. 6B. FIG. 6D and FIG. 6E are schematic diagrams illustrating images (60 µm×60 µm) showing measurement results of Cu and Li in the cross-section of the multilayer ceramic capacitor 100 in which the internal electrode layer 12 contained 10 pts. wt. co-material, respectively, and FIG. 6F is a diagram obtained by superimposing FIG. 6D on FIG. 6E. FIG. 7A is an enlarged view of a region R1 enclosed by a dotted line in FIG. 6C, and FIG. 7B is an enlarged view of a region R2 enclosed by a dotted line in FIG. 6F.

FIG. 7A reveals that for the multilayer ceramic capacitor 200 in which the internal electrode layer 12 contained no co-material, in the ceramic dielectric layer 11, the Li concentration in a region R3 near the internal electrode layer 12 is approximately equal to the Li concentration in other regions R4. On the other hand, FIG. 7B reveals that for the multilayer ceramic capacitor 100 in which the internal electrode layer 12 contained 10 pts. wt. co-material, the Li concentration in the region R3 is less than the Li concentration in other region R4. When measured on the image, the width (thickness) of the region R3 in the stacking direction was approximately 1.2 µm.

The multilayer ceramic capacitor of the embodiment was manufactured, and its characteristics were examined.

Examples 1 Through 10

Figure 8A:
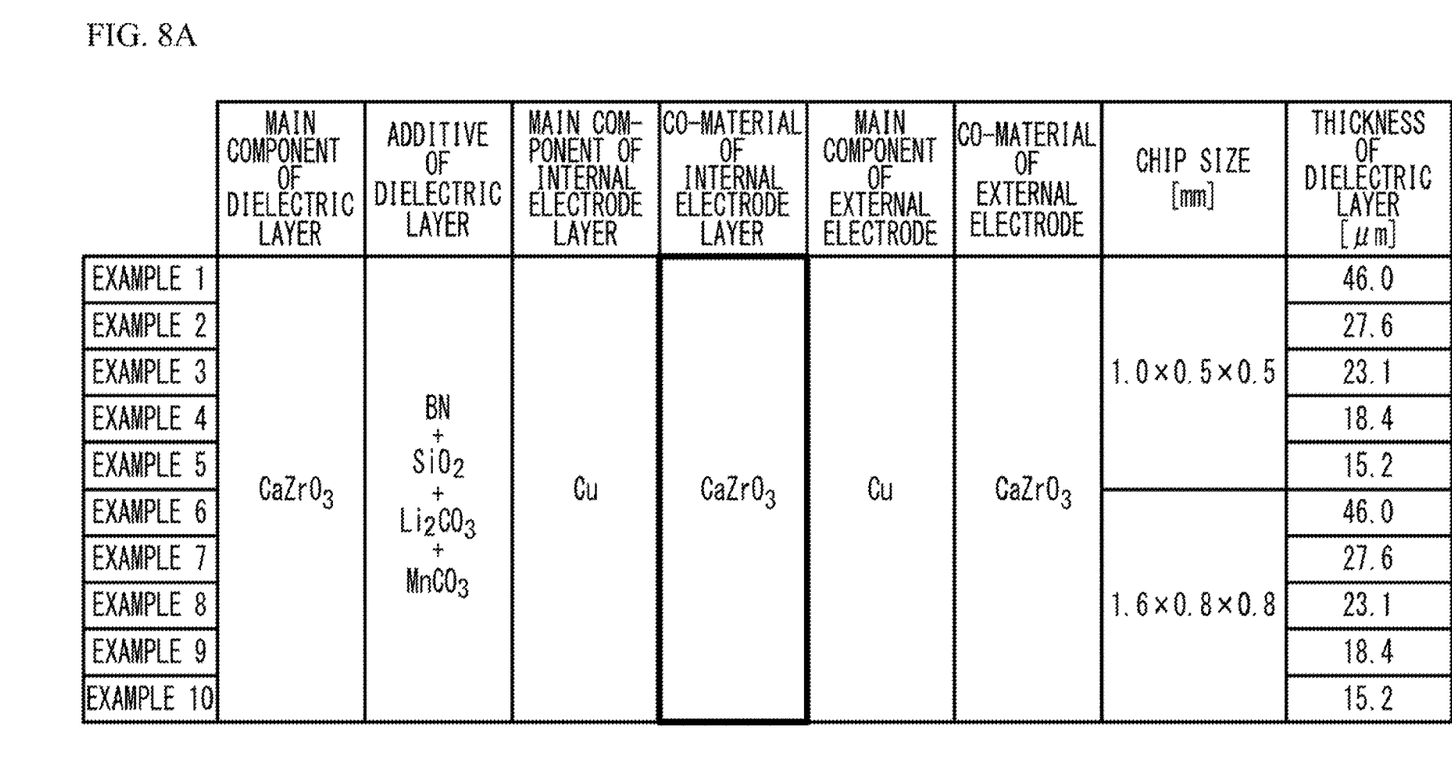
FIG. 8A presents configurations of examples 1 through 10.

As presented in FIG. 8A, $CaZrO_3$ was used as the ceramic material for the main component of the ceramic dielectric layer 11. The mol ratio of Ca to Zr (Ca/Zr) was configured to be 1.05. BN (3.5 mol %), $SiO_2$ (3.5 mol %), $Li_2CO_3$ (1.75 mol %), and $MnCO_3$ (3.5 mol %) were added as additives to the ceramic dielectric layer 11. "Mol %" of each additive represents the value when $CaZrO_3$, which is the main component, is 100 mol %. Cu was used as the main component of the internal electrode layer 12, and as indicated by a bold frame, 10 pts. wt. $CaZrO_3$ was contained as a co-material in the internal electrode layer 12. The internal electrode layer 12 contains no sintering additive containing an alkali metal and no additive containing an alkali metal. Cu was used as the main component of the ground conductive layers 21 of the external electrodes 20a and 20b, and 6 pts. wt. $CaZrO_3$ was contained as a co-material in the ground conductive layers 21. The baking process was conducted in a reducing atmosphere containing approximately 1.5 volume percent of $H_2$ at 980° C. Ni was used for the first plated layer 22. Sn was used for the second plated layer 23.

In the examples 1 through 5, the multilayer ceramic capacitor 100 had a length of 1.0 mm, a width of 0.5 mm, and a height of 0.5 mm. In the examples 6 through 10, the multilayer ceramic capacitor 100 had a length of 1.6 mm, a width of 0.8 mm, and a height of 0.8 mm.

The ceramic dielectric layer 11 had a thickness of 46.0 µm in the example 1, 27.6 µm in the example 2, 23.1 µm in the example 3, 18.4 µm in the example 4, and 15.2 µm in the example 5. The ceramic dielectric layer 11 had a thickness of 46.0 µm in the example 6, 27.6 µm in the example 7, 23.1 µm in the example 8, 18.4 µm in the example 9, and, 15.2 µm in the example 10.

Comparative Examples 1 Through 10

Figure 8B:
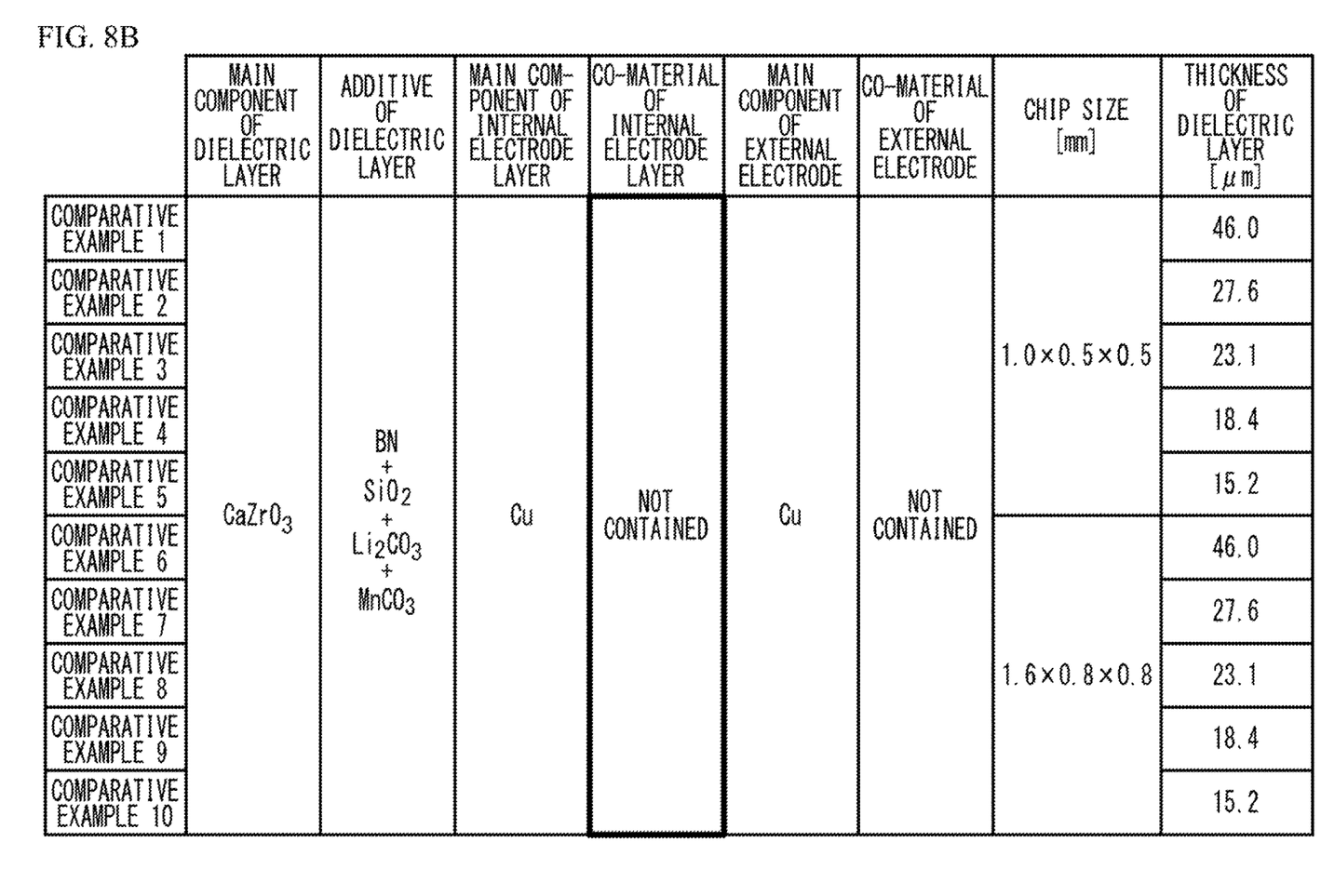
FIG. 8B presents configurations of comparative examples 1 through 10.

As presented in FIG. 8B, in comparative examples 1 through 10, as indicated by a bold frame, the internal electrode layer 12 contained no co-material. Other conditions are the same as those of the examples 1 through 10, respectively.

Analysis

Figure 9A:
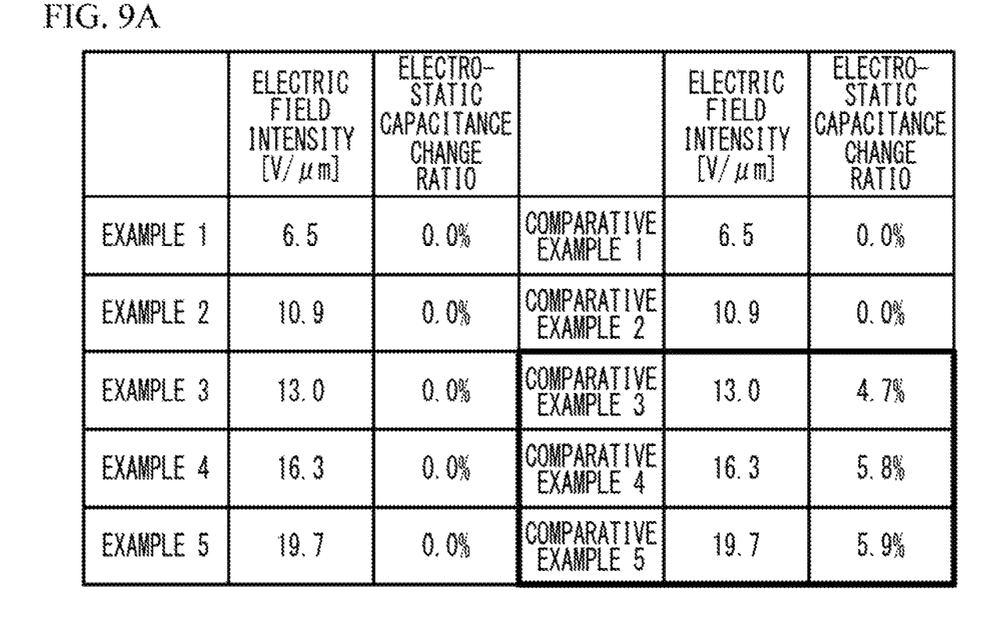
FIG. 9A and FIG. 9B present electrostatic capacitance change ratios in the examples 1 through 5 and the comparative examples 1 through 5.
Figure 9B:
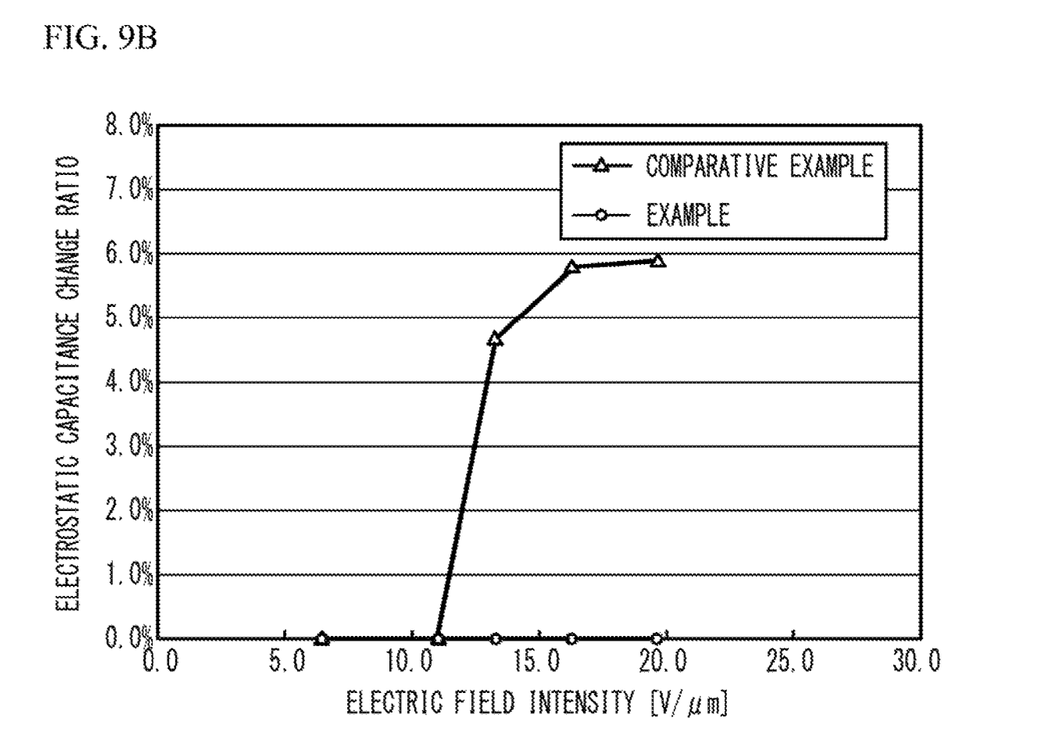

For the examples 1 through 5 and the comparative examples 1 through 5, the electrostatic capacitance before and after the voltage of the electric field intensity presented in FIG. 9A being applied at 150° C. for 1000 hours was measured to obtain the electrostatic capacitance change ratio. As presented in FIG. 9A and FIG. 9B, in any of the examples 1 through 5 the capacitance change ratio was 0.0%. On the other hand, the capacitance change ratio was 0.0% in the comparative examples 1 and 2, but, as indicated by bold frames in FIG. 9A, the electrostatic capacitance change ratio exceeded 4%, and did not satisfy the reliability standard "less than 3%" in the comparative examples 3 through 5.

Figure 10A:
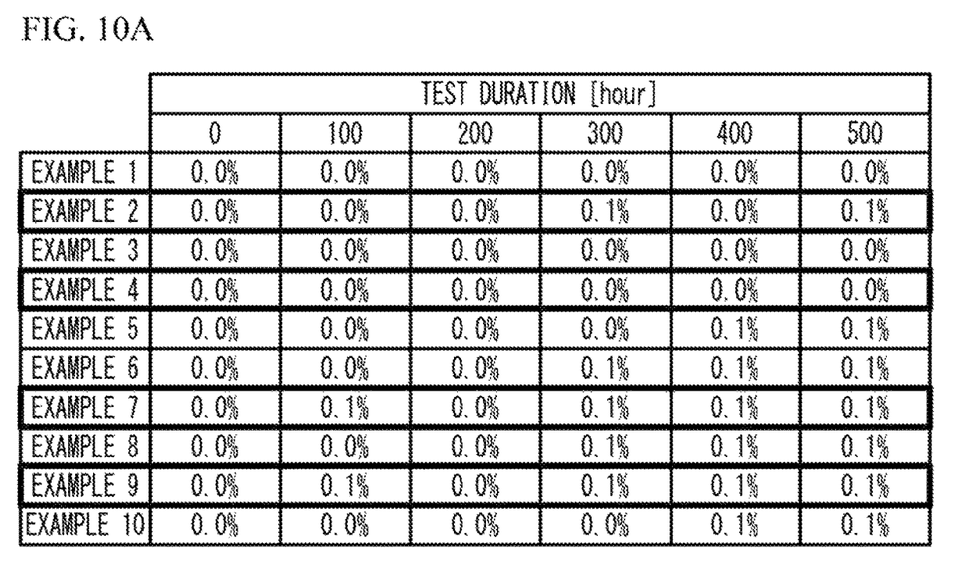
FIG. 10A presents the electrostatic capacitance change ratios of the examples 1 through 10 after a high temperature load test.
Figure 10B:
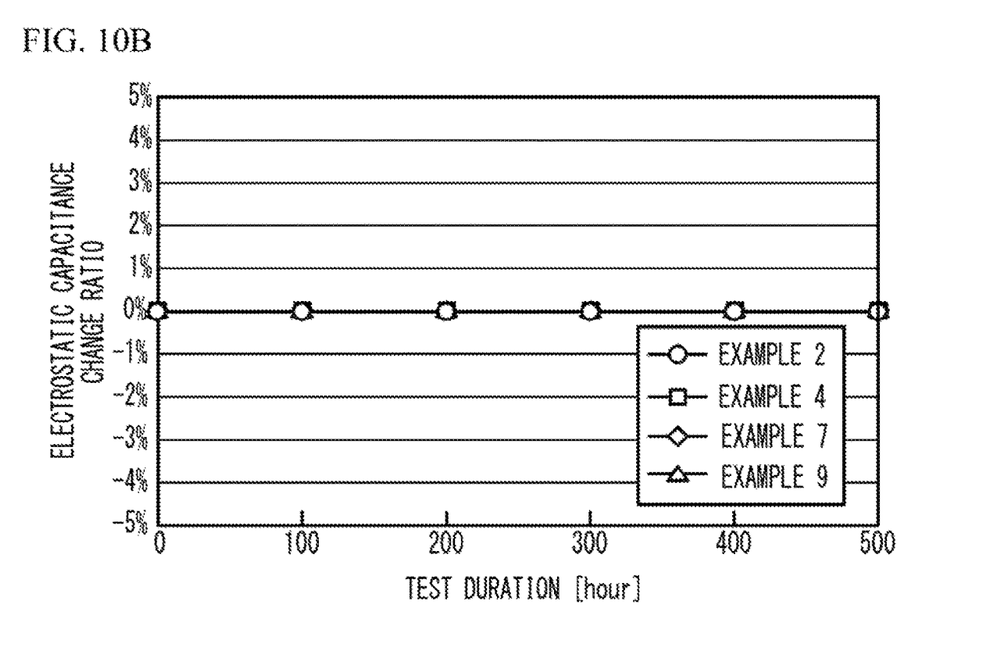
FIG. 10B is a graph presenting the results of the examples 2, 4, 7, and 9 of the examples 1 through 10.

For the examples 1 through 10 and the comparative examples 1 through 10, 100 samples were fabricated, and were subject to the high temperature load test of 600 V-150° C. The test duration was 0 hour, 100 hours, 200 hours, 300 hours, 400 hours, and 500 hours. The electrostatic capacitance before and after the test was measured to obtain the electrostatic capacitance change ratio. FIG. 10A presents the results of the examples 1 through 10, and the graph of FIG. 10B presents the results of the examples 2, 4, 7, and 9, which are enclosed by bold lines in FIG. 10A, of the examples 1 through 10. In addition, FIG. 11A presents the results of the comparative examples 1 through 10, and the graph of FIG. 11B presents the results of the comparative examples 2, 4, 7, and 9, which are enclosed by bold lines in FIG. 11A, of the comparative examples 1 through 10.

Figure 11A:
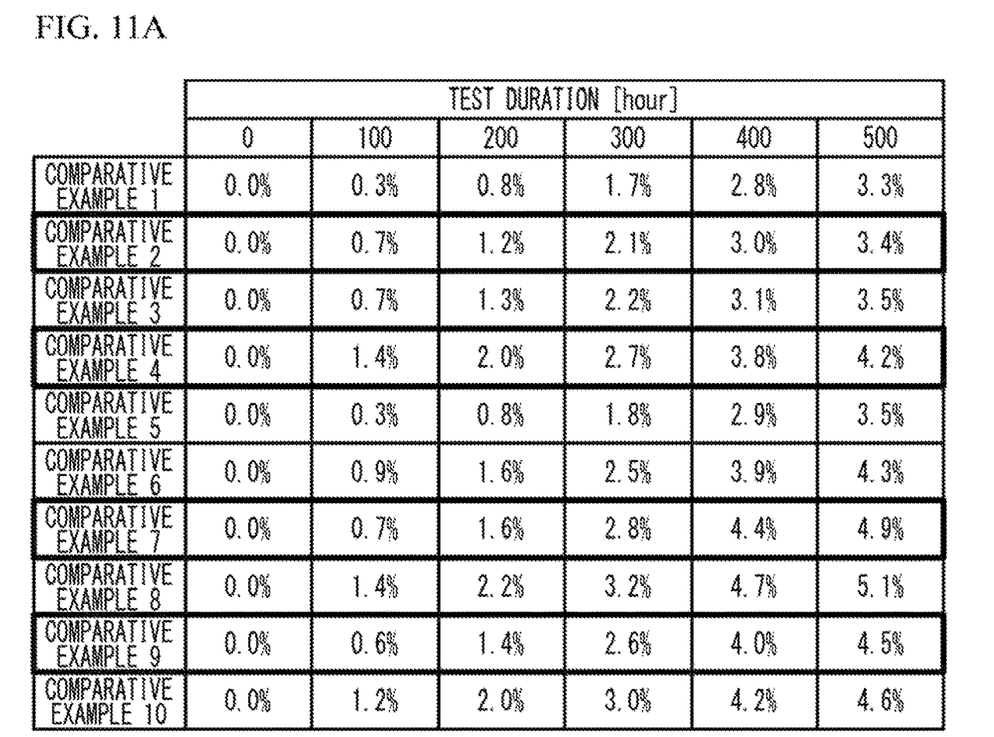
FIG. 11A presents the electrostatic capacitance change ratios of the comparative examples 1 through 10 after a high temperature load test.
Figure 11B:
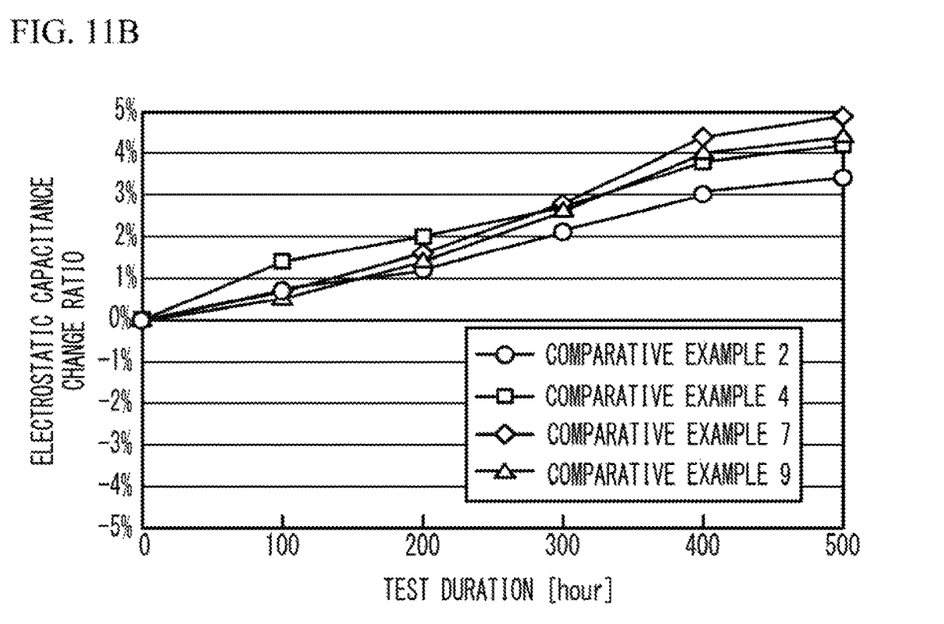
FIG. 11B is a graph presenting the results of the comparative examples 2, 4, 7, and 9 of the comparative examples 1 through 10.

As presented in FIG. 11A and FIG. 11, in the comparative examples 1 through 10, as the test duration increased, the electrostatic capacitance change ratio increased. After 500 hours, the electrostatic capacitance change ratio was 3% or greater, and did not satisfy the reliability standard "less than 3%". On the other hand, as presented in FIG. 10A and FIG. 10B, in the examples 1 through 10, even after 500 hours, the capacitance change ratio was 0.1% or less. Thus, it was confirmed that the examples 1 through 10 satisfy the reliability standard "less than 3%".

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a ceramic multilayer body including a ceramic dielectric layer and an internal electrode layer that are alternately stacked and having a substantially rectangular parallelepiped shape, the ceramic dielectric layer being mainly composed of Ca, Zr, and O and containing an alkali metal, the internal electrode layer being mainly composed of Cu and containing a co-material containing no alkali metal; and
at least two external electrodes that are coupled to a plurality of the internal electrode layers led out to an end face of the ceramic multilayer body,
wherein the co-material consists essentially of a Ca—Zr—O based material, and
wherein when a cross section parallel to a stacking direction of the multilayer ceramic capacitor is viewed at a position where the ceramic dielectric layer and the internal electrode layer are alternately stacked, a concentration of the alkali metal in a region within 1.2 μm at the ceramic dielectric layer side from a position at which the ceramic dielectric layer is in contact with the internal electrode layer is less than a concentration of the alkali metal in other regions of the ceramic dielectric layer.

2. The multilayer ceramic capacitor according to claim 1, wherein
the alkali metal is Li.

3. The multilayer ceramic capacitor according to claim 1, wherein
the ceramic dielectric layer contains B, Si, and Mn.

4. The multilayer ceramic capacitor according to claim 1, wherein
a main component of the ceramic dielectric layer is $CaZrO_3$.

5. The multilayer ceramic capacitor according to claim 1, wherein
a main component of the co-material is $CaZrO_3$.

6. The multilayer ceramic capacitor according to claim 1, wherein
the co-material is composed of a compound including Ca, Zr and O.

7. The multilayer ceramic capacitor according to claim 1, wherein
the co-material is composed of a compound composed of Ca, Zr, and O.

8. The multilayer ceramic capacitor according to claim 1, wherein
the co-material is composed of $CaZrO_3$.

9. A multilayer ceramic capacitor comprising:
a ceramic multilayer body including a ceramic dielectric layer and an internal electrode layer that are alternately stacked and having a substantially rectangular parallelepiped shape, the ceramic dielectric layer being mainly composed of Ca, Zr, and O and containing an alkali metal, the internal electrode layer being mainly composed of Cu and containing a co-material containing Ca, Zr, and O and no alkali metal; and
at least two external electrodes that are coupled to a plurality of the internal electrode layers led out to an end face of the ceramic multilayer body,
wherein when a cross section parallel to a stacking direction of the multilayer ceramic capacitor is viewed at a position where the ceramic dielectric layer and the internal electrode layer are alternately stacked, a concentration of the alkali metal in a region within 1.2 μm at the ceramic dielectric layer side from a position at which the ceramic dielectric layer is in contact with the internal electrode layer is less than a concentration of the alkali metal in other regions of the ceramic dielectric layer.

10. A multilayer ceramic capacitor comprising:
a ceramic multilayer body including a ceramic dielectric layer and an internal electrode layer that are alternately stacked and having a substantially rectangular parallelepiped shape, the ceramic dielectric layer being mainly composed of Ca, Zr, and O and containing an alkali metal, the internal electrode layer being mainly composed of Cu and containing a co-material containing Ca, Zr, and O and no alkali metal; and
at least two external electrodes that are coupled to a plurality of the internal electrode layers led out to an end face of the ceramic multilayer body,
wherein when a cross section parallel to a stacking direction of the multilayer ceramic capacitor is viewed at a position where the ceramic dielectric layer and the internal electrode layer are alternately stacked, the ceramic dielectric layer includes a section including Cu at an interface between the dielectric layer and the internal electrode layer, and includes a $CaZrO_3$ layer of which a concentration of an alkali metal is less than that of the section, between the section and the internal electrode layer.

11. A multilayer ceramic capacitor comprising:
a ceramic multilayer body including a ceramic dielectric layer and an internal electrode layer that are alternately stacked and having a substantially rectangular parallelepiped shape, the ceramic dielectric layer being mainly composed of Ca, Zr, and O and containing an alkali metal, the internal electrode layer being mainly composed of Cu and containing a co-material containing no alkali metal, wherein the co-material consists of $CaZrO_3$; and
at least two external electrodes that are coupled to a plurality of the internal electrode layers led out to an end face of the ceramic multilayer body.

* * * * *